United States Patent [19]

Sjöstrand

[11] Patent Number: 5,186,306
[45] Date of Patent: Feb. 16, 1993

[54] METHOD AND AN APPARATUS FOR MARSHALLING OBJECTS

[75] Inventor: Uno Sjöstrand, Flyinge, Sweden

[73] Assignee: Tetra Alfa Holdings S.A., Pully, Switzerland

[21] Appl. No.: 794,377

[22] Filed: Nov. 15, 1991

Related U.S. Application Data

[63] Continuation of Ser. No. 592,979, Oct. 5, 1990, abandoned.

[30] Foreign Application Priority Data

Nov. 23, 1989 [SE] Sweden .................. 8903937

[51] Int. Cl.$^5$ .................................. B65G 47/27
[52] U.S. Cl. .................. 198/442; 198/437; 198/367; 198/459
[58] Field of Search .......... 198/362, 366, 367, 367.1, 198/368, 436, 437, 442, 459, 461

[56] References Cited

U.S. PATENT DOCUMENTS

| 3,326,349 | 6/1967 | Pettis et al. | 198/367 |
| 3,599,789 | 8/1971 | Kurczak | 198/367 X |
| 3,848,746 | 11/1974 | van der Winden | 198/442 |
| 4,003,465 | 1/1977 | Bauer | 198/442 |
| 4,060,165 | 11/1977 | Bauer | 198/442 |
| 4,069,908 | 1/1978 | Johnson et al. | 198/437 |
| 4,147,248 | 4/1979 | Kurczak et al. | 198/367 X |
| 4,443,995 | 4/1984 | Myers et al. | 198/461 X |
| 4,462,516 | 7/1984 | Guerzoni | 198/367 X |
| 4,679,685 | 7/1987 | Inoko | 198/461 |
| 4,732,268 | 3/1988 | Sjostrand | 198/831 |
| 4,856,646 | 8/1989 | Sjostrand | 198/836 |
| 4,934,510 | 6/1990 | Lutgendorf | 198/461 |

FOREIGN PATENT DOCUMENTS

| 1190883 | 4/1965 | Fed. Rep. of Germany | 198/367 |
| 60-122623 | 7/1985 | Japan . | |
| 0150919 | 7/1986 | Japan | 198/367 |
| 2053824 | 7/1979 | United Kingdom . | |

Primary Examiner—Robert P. Olszewski
Assistant Examiner—James R. Bidwell
Attorney, Agent, or Firm—Burns, Doane, Swecker & Mathis

[57] ABSTRACT

A method and an apparatus for marshalling objects from one ingoing conveyor to two outgoing conveyors is disclosed. Counting gaps are created by a belt brake operating at a slower speed than the ingoing conveyor. The counting gaps are registered by a pair of photocells, and two gates are maneuvered by a control unit. The gate downstream of the ingoing conveyor is of the single type, and the gate downstream of both of the outgoing conveyors is of the double type. The gates are mechanically interconnected and rotate towards one another in order to marshall the objects onto one or the other of the outgoing conveyors.

3 Claims, 2 Drawing Sheets

METHOD AND AN APPARATUS FOR MARSHALLING OBJECTS

This application is a continuation of application Ser. No. 07/592,979, filed Oct. 5, 1990, now abandoned.

TECHNICAL FIELD

The present invention relates to a method of marshalling objects which are advanced on one ingoing conveyor onto two outgoing conveyors, and an apparatus for carrying the method into effect.

BACKGROUND ART

Use is often made within the manufacturing industry of conveyors for moving objects from, for example, a production unit to packing or distribution stage. In the packing of foods such as into milk or juice in disposable cartons, the ready-filled cartons are conveyed from the filling machine to a distribution unit in order that the cartons may more readily be handled in the distribution stage by the consumer.

In general, cartons are conveyed from a filling machine on a single conveyor extending from the filling machine. It is occasionally desirable to marshal the cartons traveling on this single conveyor onto two different conveyors such that it will be possible to cause a certain number of cartons to be distributed in one way and the remaining number of cartons in another way. Objects on two conveyors may also be led into one and the same distribution unit thereby increasing output capacity.

However, problems have previously been experienced in this art in exactly marshalling cartons or other objects in a given distribution ratio. Furthermore, prior art distributor devices have not proved capable of marshalling objects moving their way into or out of the distributor, but instead it has been necessary to run the distributor until completely empty. This results in an output capacity that will be very low.

SUMMARY OF THE INVENTION

One object of the present invention is to devise a method for marshalling an exact number of objects, for example cartons or packages, from one ingoing conveyor onto two outgoing conveyors, while retaining output capacity.

This and other objects are attained according to the present invention in that a method of the type described by way of introduction is characterised in that the objects, with a view to creating counting gaps, are spread out by means of a belt brake at slower speed than the above-mentioned ingoing conveyor, whereafter the objects are marshalled onto the two outgoing conveyors in that two cooperating gates guide the objects to the one or the other outgoing conveyor.

A further object of the present invention is to devise an apparatus for marshalling objects, the output capacity of the apparatus not being impaired by the necessity of emptying the distributor unit on each marshalling switch, but exact distribution may take place simultaneously as the objects move through the distributor.

These and other objects are attained according to the present invention in that an apparatus of the type described by way of introduction is characterised by a movable gate secured on the ingoing conveyor and cooperating with a movable gate secured on the outgoing conveyors, and photocells provided for registration of a number of objects.

BRIEF DESCRIPTION OF THE ACCOMPANYING DRAWINGS

The nature of the present invention and its aspects will be more readily understood from the following brief description of the accompanying Drawings, and discussion relating thereto.

DESCRIPTION OF PREFERRED EMBODIMENT

Figure 1:
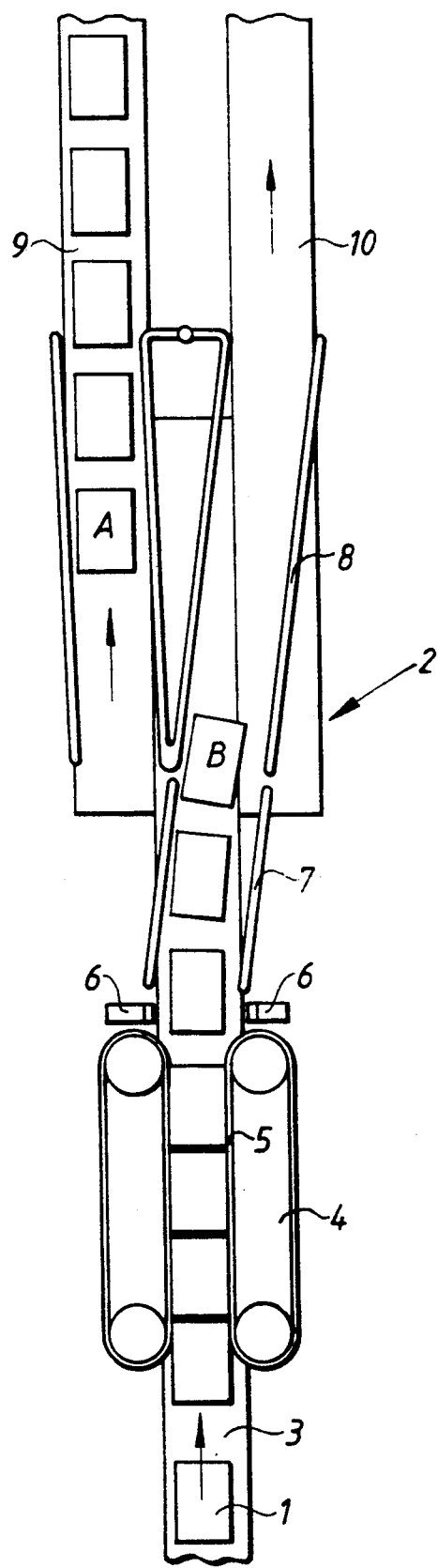
FIG. 1 is a plan view of a distributor with ingoing and outgoing conveyors.

As is illustrated in FIG. 1, cartons 1 advance in the direction shown towards a distributor 2 on a conveyor 3 having an endless conveyor surface. Just upstream of the distributor 2, is a belt brake 4 of conventional type in which belts 5 protrude in towards the cartons 1 on either side thereof and retard the movement of the cartons 1 thus causing the cartons to slip on the conveyor surface. The belt brake 4 releases the cartons 1 such that the cartons are spaced on the conveyor by uniform spacing or gaps.

These gaps between the cartons 1 are detected by a sensing device such as a pair of photocells 6 disposed downstream of the belt brake 4 in the direction of movement of the cartons 1. The detections are transmitted to a master control system and, after a predetermined number of gaps has been detected, i.e. after a certain number of cartons 1 has departed from the belt brake 4 the master control system emits a signal tothe belt brake 4 which causes the brake 4 to restrain further movement of the subsequent carton 1 so that a longer gap, or marshalling gap, is introduced. The length of this marshalling gap varies in accordance with the size of the objects and the speed of the conveyors. After a certain time-lag which allows the cartons to move such that the marshalling gap is located in alignment with the joint between two gates 7, 8 in the distributor 2, the master control system emits a switch signal.

Figure 2:
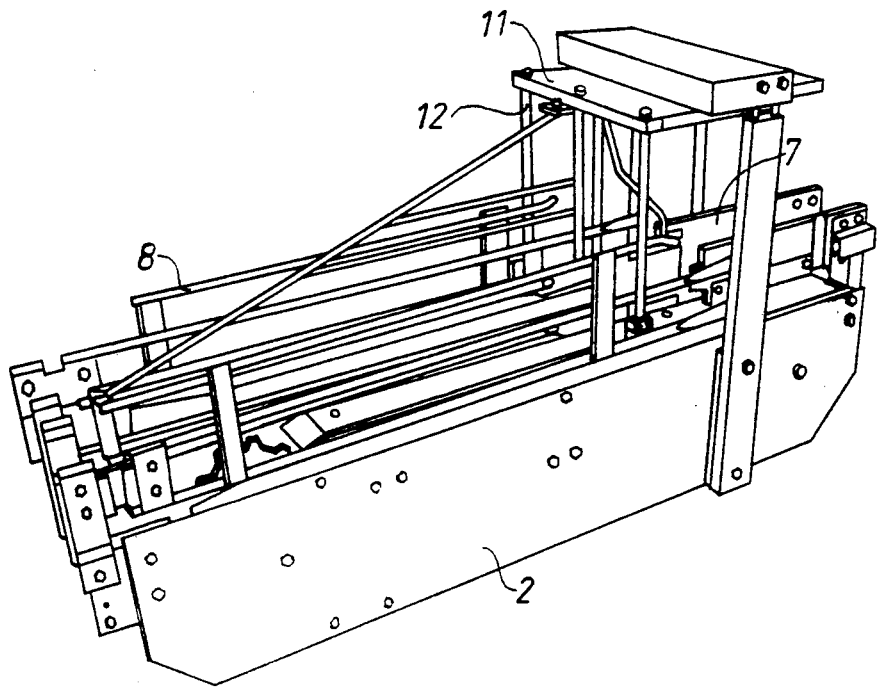
FIG. 2 is a perspective view of marshalling gates; of a marshalling apparatus in accordance with the present invention.

The two gates, a single gate 7 above the ingoing conveyor 3 and a double gate 8 above both of the outgoing conveyors 9 and 10, are each mechanically interconnected with parallel arms 11 which are illustrated in FIG. 2. When these arms 11 are suitably manoeuvred by a pneumatic piston and cylinder assembly, each of the gates 7 and 8 rotate such that a path is opened either from the ingoing conveyor 3 to the left-hand outgoing conveyor 9, or from the ingoing conveyor 3 to the right-hand outgoing conveyor 10. Since both gates 7 and 8 rotate each gate has a shorter distance to travel than if only one gate is utilized to change path direction. The use of two moving gates results in a more rapid distributor. Each gate 7, 8 is required to change its angular position by only 50% of what would be necessary if one single gate were utilized to change path direction.

When the marshalling gap is located between the single gate 7 and the double gate 8, the gates 7 and 8 begin to rotate towards one another. When rotation occurs, the distributor 2 has already been filled with a certain number of cartons 1. These cartons accompany the gates 7 and 8 in their movements without being obstructed in their advancement. FIG. 1 is exemplary of the location of cartons after a switch has just taken place between cartons A and B. When a preselected number of cartons 1 after carton B has departed from the belt brake 4, a marshalling gap is once again created and a signal is emitted (with time-lag) to the gates 7 and 8, whereafter switching takes place once again.

FIG. 2 illustrates the gates 7 and 8 and the superjacent parallel arms 11, which provide the coordinated movement of the gates 7 and 8 towards one another. The parallel arms 11 are connected to the gates 7 and 8 by means of vertical struts 12. The gates 7 and 8 may also be interconnected such that some form of parallel arm linkage is disposed beneath the conveyors.

Figure 3:
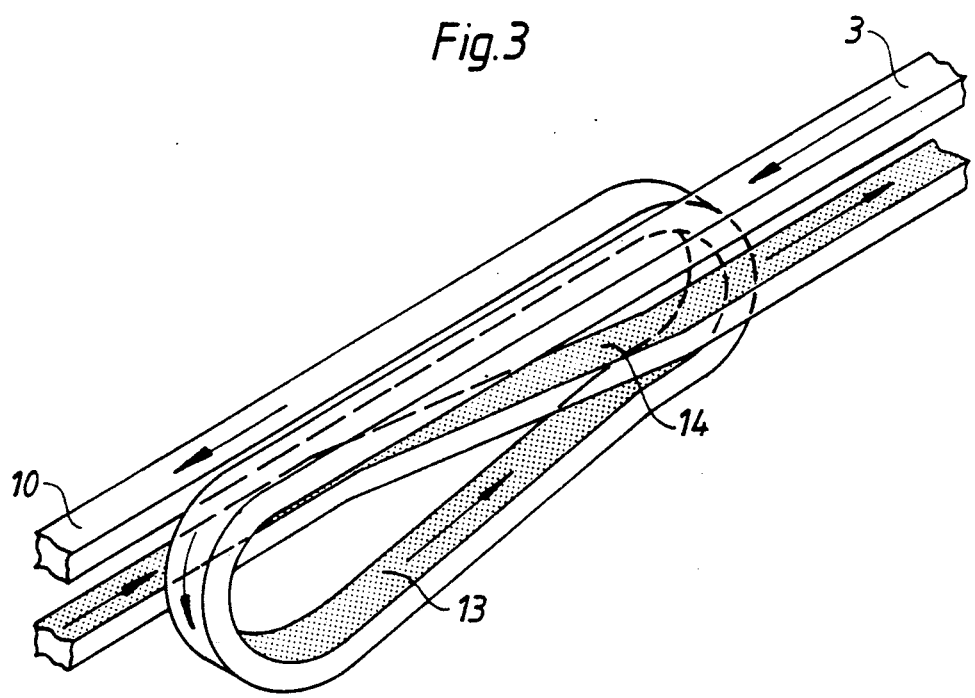
FIG. 3 is a perspective view of an ingoing conveyor which also serves as one of the outgoing conveyors on a marshalling apparatus in accordance with the present invention.

FIG. 3 shows how the ingoing conveyor 3 may be also be utilized as one of the outgoing conveyors 10, thus avoiding the need for one drive station. The second outgoing conveyor 9 is wholly separate from this arrangement, with its own drive station. The ingoing conveyor 3 turns and runs obliquely backwards on a rail 13, turning upwards again as an outgoing conveyor 10. Then, when the outgoing conveyor 10 reaches its final destination, it once again turns and returns. On its return, the conveyor 10 changes level so that it can pass beneath the distributor 2. During this return, the conveyor 10 obliquely, on a rail 14, under the distributor 2 until it turns a final time and again serves as the ingoing conveyor 3. On its return, the conveyor changes level and turns upwards to the starting point.

As will be apparent from the above description, the present invention realises a method and an apparatus for marshalling objects from one conveyor onto two conveyors, with a maintained high output capacity since the switching between the different conveyors can take place while objects are still in the distributor. Distributors according to the present invention also make possible the distribution of an exact number onto each conveyor, which may be necessary when a certain proportion of production is intended to be conveyed to one distribution unit and the remaining proportion of production to another distribution unit.

We claim:

1. Apparatus for marshalling objects comprising:
an ingoing conveyor;
a pair of outgoing conveyors arranged in substantially parallel relation to each other, said ingoing conveyor and said outgoing conveyors being positioned for advancing objects in substantially the same direction; said ingoing conveyor extending between said outgoing conveyors;
movable gate means for displacing objects from the ingoing conveyor to a selected one of said outgoing conveyors, said movable gate means including first and second movable gates; said first gate being mounted for swinging laterally relative to the ingoing conveyor and having a pair of guide members in position for guiding objects from the ingoing conveyor to a selected one of said outgoing conveyors; said second gate being mounted for swinging laterally relative to the outgoing conveyors between a first position and a second position and having first and second pairs of guide members;
said first pair of guide members being aligned with one of said outgoing conveyors and said second pair of guide members extending diagonally across said ingoing conveyor and the other of said outgoing conveyors when said second gate is in said first position;
said first pair of guide members extending diagonally across said ingoing conveyor and said one outgoing conveyor and said second pair of guide members being aligned with said other outgoing conveyor when said second gate is in said second position;
belt brake means disposed along said ingoing conveyor restraining advancement of said objects on said ingoing conveyor relative to movement of said ingoing conveyor as the objects pass through the brake such that said objects are substantially equally spaced from each other after said objects leave said belt brake.

2. An apparatus for marshalling objects according to claim 1 wherein said ingoing conveyor and at least one of said pair of outgoing conveyors are interconnected by a common conveying track, said conveying track being an endless loop.

3. An apparatus for marshalling objects according to claim 1, wherein a pair of photocells are disposed opposite each other downstream of said belt brake for registering gaps between said objects.

* * * * *